US010547221B2

(12) United States Patent
Lee et al.

(10) Patent No.: US 10,547,221 B2
(45) Date of Patent: Jan. 28, 2020

(54) COMPRESSOR MOTOR AND METHOD FOR MAGNETIZING ROTOR THEREOF

(71) Applicant: SAMSUNG ELECTRONICS CO., LTD., Suwon-si, Gyeonggi-do (KR)

(72) Inventors: Dong-bum Lee, Suwon-si (KR);
Gyeong-don Kim, Seoul (KR);
Young-ju Ryu, Suwon-si (KR);
Jong-hyun Choi, Suwon-si (KR);
In-cheol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 15/473,028

(22) Filed: Mar. 29, 2017

(65) Prior Publication Data
US 2017/0288483 A1 Oct. 5, 2017

(30) Foreign Application Priority Data

Apr. 5, 2016 (KR) .......................... 10-2016-0041806
Feb. 3, 2017 (KR) .......................... 10-2017-0015368

(51) Int. Cl.
*H02K 21/12* (2006.01)
*H02K 1/27* (2006.01)
*H02K 15/03* (2006.01)

(52) U.S. Cl.
CPC ........... *H02K 1/2706* (2013.01); *H02K 15/03* (2013.01)

(58) Field of Classification Search
CPC ............................ H02K 1/2706; H02K 15/03
USPC .................... 310/156.01–156.84, 43; 29/596
See application file for complete search history.

(56) References Cited

U.S. PATENT DOCUMENTS

| 5,864,191 | A | * | 1/1999 | Nagate | H02K 1/276 |
|           |   |   |        |        | 310/156.53 |
| 7,808,147 | B2 | * | 10/2010 | Riedl | H02K 1/2773 |
|           |   |   |        |        | 310/156.53 |
| 8,063,530 | B2 | * | 11/2011 | Podack | H02K 1/276 |
|           |   |   |        |        | 310/156.08 |
| 2006/0220485 | A1 | * | 10/2006 | Shim | H02K 1/02 |
|           |   |   |        |        | 310/156.45 |
| 2007/0145849 | A1 | * | 6/2007 | Okamoto | H02K 1/276 |
|           |   |   |        |        | 310/156.53 |

(Continued)

FOREIGN PATENT DOCUMENTS

EP 1788690 5/2007
EP 2573917 3/2013

(Continued)

OTHER PUBLICATIONS

Extended European Search Report dated Aug. 28, 2017 in European Patent Application No. 17164595.5.

(Continued)

*Primary Examiner* — Hanh N Nguyen
(74) *Attorney, Agent, or Firm* — Staas & Halsey LLP

(57) ABSTRACT

A compressor motor and a method for magnetizing a rotor thereof are provided. The compressor motor includes a stator and a rotor configured to electromagnetically interact with the stator to be rotated, wherein the rotor includes a core, a plurality of magnets inserted into the core, and a cover configured to cover both end portions of the core and to be injection-molded so as to fill accommodation spaces that are formed between the core and the plurality of magnets.

19 Claims, 14 Drawing Sheets

(56) References Cited

U.S. PATENT DOCUMENTS

2011/0162199 A1 7/2011 Johnson et al.
2014/0001911 A1 1/2014 Tang et al.

FOREIGN PATENT DOCUMENTS

| JP | 05-43752 U | 6/1993 |
|---|---|---|
| JP | 11-27908 A | 1/1999 |
| JP | 3635485 B2 | 4/2005 |
| JP | 4699723 B2 | 6/2011 |
| KR | 10-0415825 B1 | 1/2004 |
| KR | 10-2005-0045158 A | 5/2005 |
| KR | 10-683595 B1 | 2/2007 |
| KR | 10-2009-0125644 A | 12/2009 |
| KR | 10-1092169 B1 | 12/2011 |
| KR | 10-1097398 B1 | 12/2011 |

OTHER PUBLICATIONS

European Communication dated Jul. 23, 2018 in European Patent Application No. 17164595.5.

\* cited by examiner

COMPRESSOR MOTOR AND METHOD FOR MAGNETIZING ROTOR THEREOF

CROSS-REFERENCE TO RELATED APPLICATIONS

This application claims priority from Korean Patent Application Nos. 10-2016-0041806 and 10-2017-0015368 filed on Apr. 5, 2016 and Feb. 3, 2017, respectively, in the Korean Intellectual Property Office, the disclosure of which is incorporated herein by reference in its entirety.

BACKGROUND OF THE INVENTION

Field of the Invention

The present disclosure relates to a compressor motor, and more particularly to a compressor motor in which a plurality of magnets are inserted into a rotor.

Description of the Related Art

In general, a compressor that forms one element of a refrigerating cycle is provided with a compressor motor, and such a compressor motor is classified into several types in accordance with a driving method thereof. As an example, a capacity variable type compressor uses a brushless motor, and includes an inverter that is controlled by a controller. Such a variable type compressor generally uses a method for driving a compressor motor through applying of a voltage that is generated in accordance with a switching operation of a switching element provided in the inverter to motor windings.

Such a compressor motor is composed of a stator and a rotor, and the rotor is configured to electromagnetically interact with the stator and is rotated by a force that acts between a magnetic field and current that flows through a coil.

The rotor is briefly classified into a SPM (Surface Permanent Magnet) type in which magnets surround a rotor in accordance with the coupling structure thereof and an IPM (Interior Permanent Magnet) type in which magnets are buried and fixed into a rotor.

Since the SPM type rotor is surrounded by the magnets having uniform reluctance, there occurs no reluctance change, and thus the rotor is operated purely in dependence upon torques that are generated by the magnets. Accordingly, the torques generated per unit current become low to deteriorate efficiency of the rotor. Further, the SPM type rotor has the drawback that man-hour, such as a magnet bonding process, becomes complicated, and during high-speed rotation of the rotor, the magnet may secede from a core to form a gap between the magnet and the core. Further, eddy current may flow in a non-magnetic body to cause a power loss to occur.

Accordingly, the IPM type rotor, in which the magnets are buried and fixed into the rotor, has been proposed.

However, in an environment where the rotor is rotated at a low speed in order to heighten the efficiency of the motor, the magnets may be moved while the rotor is rotated at a constant speed, for example, at a low speed.

In the case where the magnets are moved as described above, the magnets may be deformed or damaged due to friction between the magnets and the core. Further, in the case where fine powder that is generated as the magnets are worn down is discharged together with a coolant that flows into a compression chamber of the compressor, a cylinder, a piston, and a valve device may be damaged. If the powder that is generated due to the abrasion of the magnets continuously circulates in the refrigerating cycle together with the coolant, an expansion valve may be clogged.

On the other hand, if the magnets, which are inserted into the rotor, have already been magnetized prior to the insertion, it is required to determine polarities of the magnets when the magnets are inserted into the rotor and to arrange the magnets so that the polarities of the magnets cross each other. Accordingly, it is required to confirm the polarities of the magnets one by one when inserting the magnets into the rotor, and this may cause a delay in a rotor manufacturing process.

In order to solve the delay problem in the rotor manufacturing process and to easily manufacture the rotor, non-magnetized magnets are inserted into the rotor. The magnets, which initially have no polarity, may have the polarities through a magnetization process in a state where the magnets are inserted into the rotor. Since the magnets have the polarities, the rotor may be rotated through electrical interaction with the stator on the inside of the stator. Through the rotation of the rotor, the driving force of the motor can be transferred to the compressor.

In this case, it is required to match the position of the rotor with a magnetization device so that a portion that becomes a magnetic pole of the non-magnetized magnet corresponds to the magnetic pole position of magnetic flux that is generated by the magnetization device. In the related art, in order to match the magnetization position of the rotor with the magnetization device, a guide hole is formed on an upper portion of the rotor, and a pin is inserted into the guide hole to match the rotor with the magnetization position. Further, during the magnetization, the rotor is fixed to the magnetization position by the pin.

However, in matching the magnetization position of the rotor using the guide hole and the pin and fixing the rotor to the magnetization position in the related art, the pin may not be accurately inserted into an insertion hole, and thus a cover may be broken to cause foreign substances to be generated. Further, during the magnetization, the pin may be damaged due to magnetization impacts. If the pin is damaged, the rotor is rotated by a rotating magnetic field that is formed in the magnetization process to cause the magnetization position to be distorted. Accordingly, the magnetization of the magnets may fail or may be insufficiently performed, and thus the performance of the motor that includes such a rotor may be deteriorated.

SUMMARY OF THE INVENTION

Exemplary embodiments of the present disclosure overcome the above disadvantages and other disadvantages not described above, and provide a compressor motor which can prevent movement of magnets inserted into a core while a rotor is rotated.

Further, exemplary embodiments of the present disclosure provide a compressor motor which can easily and accurately locate a rotor in a magnetization position before magnetization of magnets and can prevent rotation of the rotor during the magnetization of the magnets.

According to an aspect of the present disclosure, a compressor motor includes a stator; and a rotor, wherein the rotor includes a core; a plurality of magnets inserted into the core; and a cover configured to cover both end portions of the core and to be injection-molded so as to fill accommodation spaces that are formed between the core and the plurality of magnets.

The accommodation spaces may be provided between upper or lower end portions of the magnets and a plurality of insertion holes of the core into which the plurality of magnets are respectively inserted.

The cover may include extension portions that occupy the accommodation spaces.

The extension portions may have cross sections that are in a triangle shape.

The accommodation spaces may be formed along edges of at least one of the upper and lower end portions of the magnets.

The accommodation spaces may be provided between inclined surfaces that are formed along edges of at least one of upper and lower end portions of the magnets and inner peripheries of a plurality of insertion holes of the core into which the respective magnets are respectively inserted.

The inclined surfaces may be formed on at least parts of the edges of the upper or lower end portions of the magnets.

The inclined surfaces may be formed to be downwardly inclined in outside directions of the magnets.

The magnets may be "C"-type magnets (e.g. magnets in "C" shape in which one surface thereof convexly projects toward the center of the core).

The cover may include rotation prevention guides configured to prevent the rotor from being rotated while the plurality of magnets are magnetized.

The rotation prevention guides may be formed to project from parts of the cover that covers one end portion of the core.

The rotation prevention guides may be symmetrically arranged about a center of the core.

According to another aspect of the present disclosure, a compressor motor includes a stator; and a rotor, wherein the rotor includes a plurality of magnets having inclined surfaces that are formed along edges of upper and lower end portions of the magnets; a core configured to have a plurality of insertion holes which are formed thereon and into which the plurality of magnets are respectively inserted; first and second covers configured to cover both end portions of the core by means of injection molding; and extension portions integrally formed with the first and second covers, wherein the extension portions occupy accommodation spaces that are formed between inner peripheries of the plurality of insertion holes and the inclined surfaces of the plurality of magnets.

The inclined surfaces may be formed to be downwardly inclined in outside directions of the magnets.

The magnets may be "C"-type magnets (e.g. magnets in "C" shape in which one surface thereof convexly projects toward the center of the core).

The second cover may include rotation prevention guides that are integrally injection-molded with the second cover.

The rotation prevention guides may fix the rotor thereto when the magnets are magnetized.

The rotation prevention guides may locate the rotor in a magnetization position.

The rotation prevention guides may be symmetrically formed about a center of the core.

According to still another aspect of the present disclosure, a method for magnetizing a plurality of magnets that are inserted into an inside of a rotor of a compressor motor includes setting a magnetization position of the rotor through straight movement of a fixing jig; moving a magnetization yoke so that a plurality of projections of the magnetization yoke are inserted into positions that correspond to the plurality of magnets of the rotor; and magnetizing the plurality of magnets through application of a magnetization power to the magnetization yoke.

The setting the magnetization position of the rotor may rotate the rotor to the magnetization position through pushing of the fixing jig to rotation prevention guides that project from one end portion of the rotor in an axis direction of the rotor.

The fixing jig may continuously support the rotation prevention guides during the magnetization.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

Figure 6A:
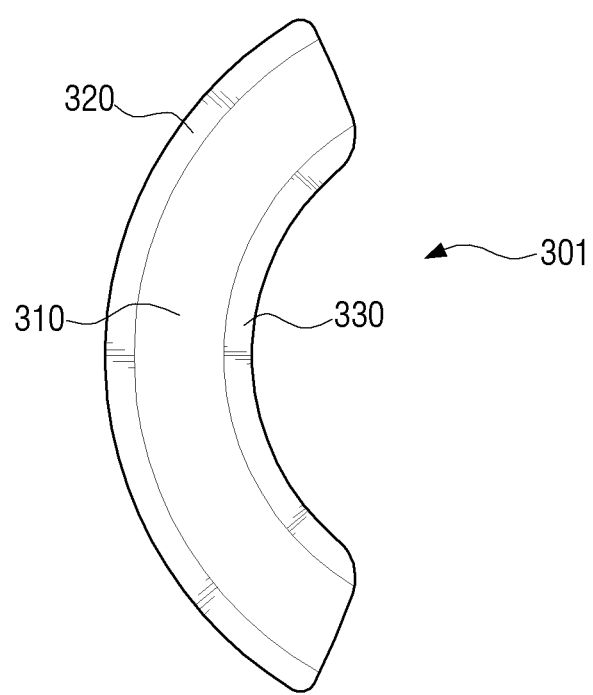
Figure 6B:
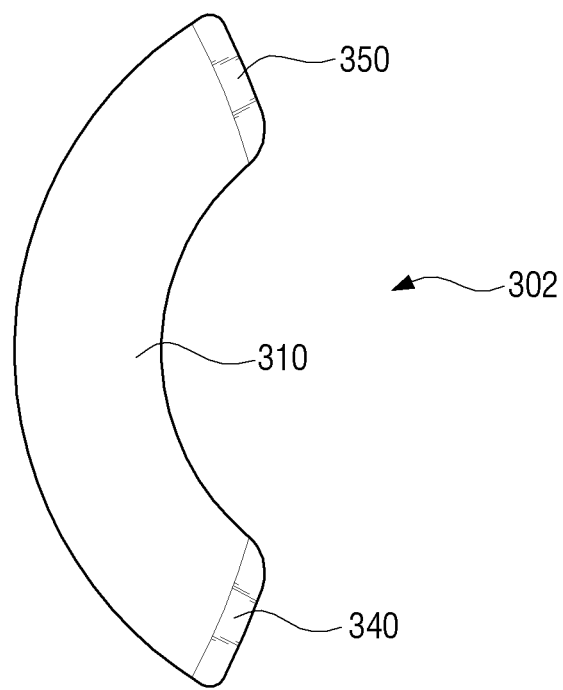
Figure 6C:
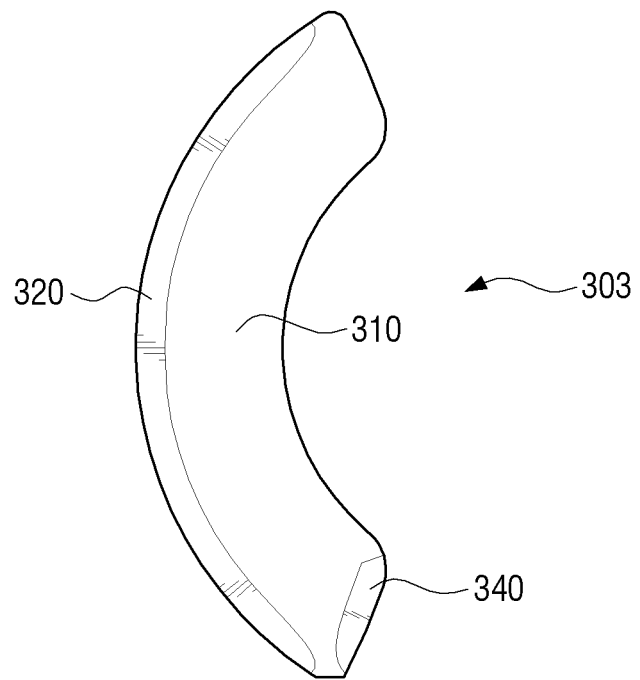
Figure 7:
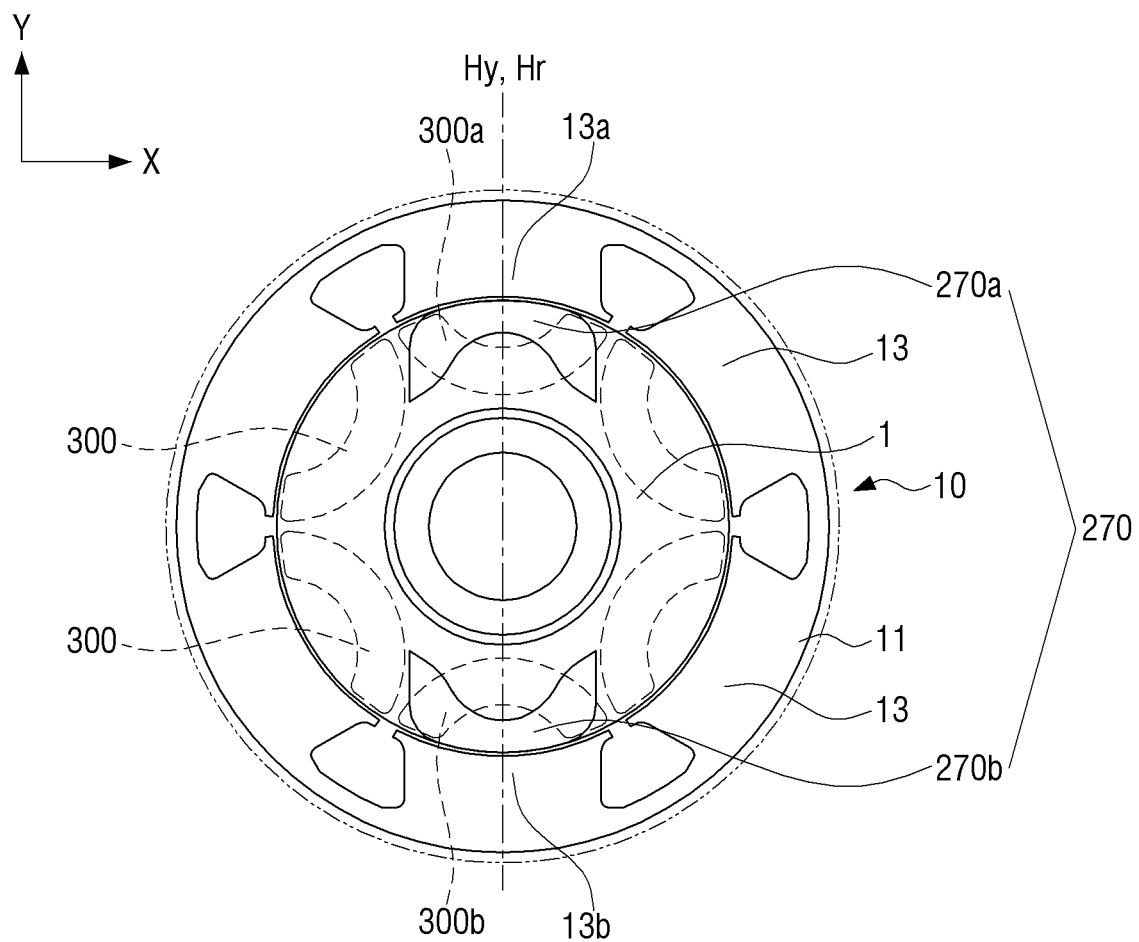
Figure 8:
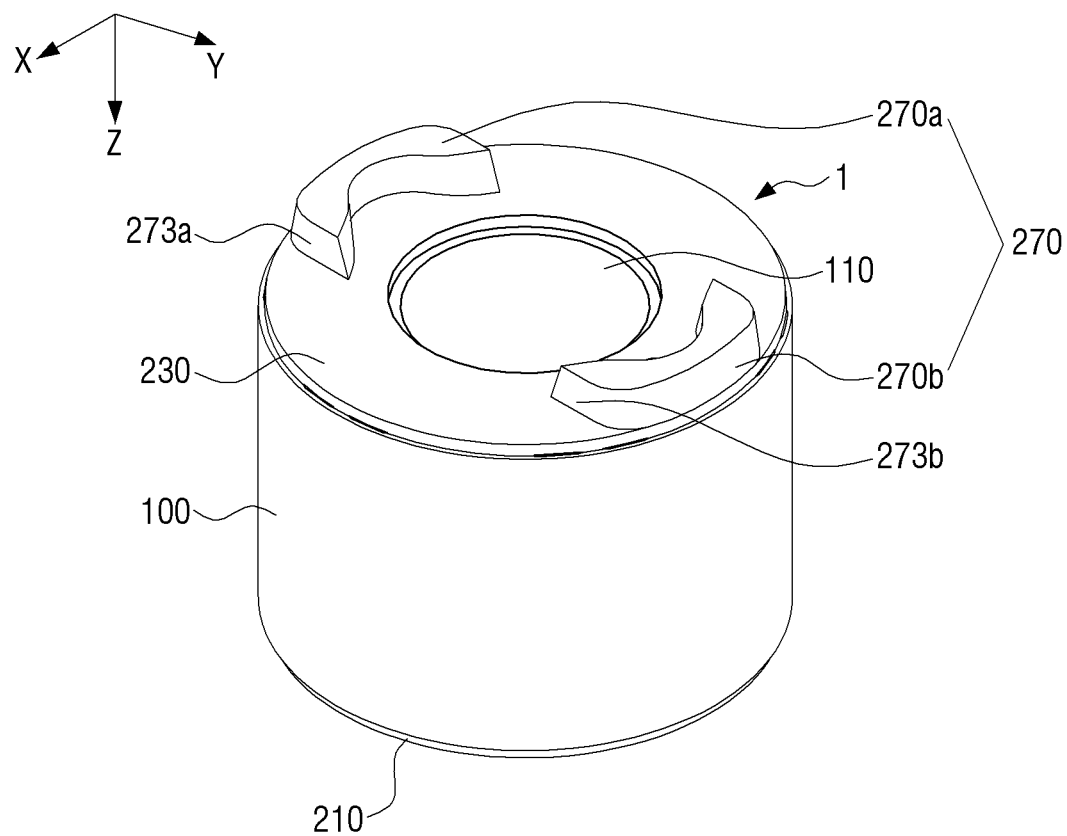
Figure 9A:
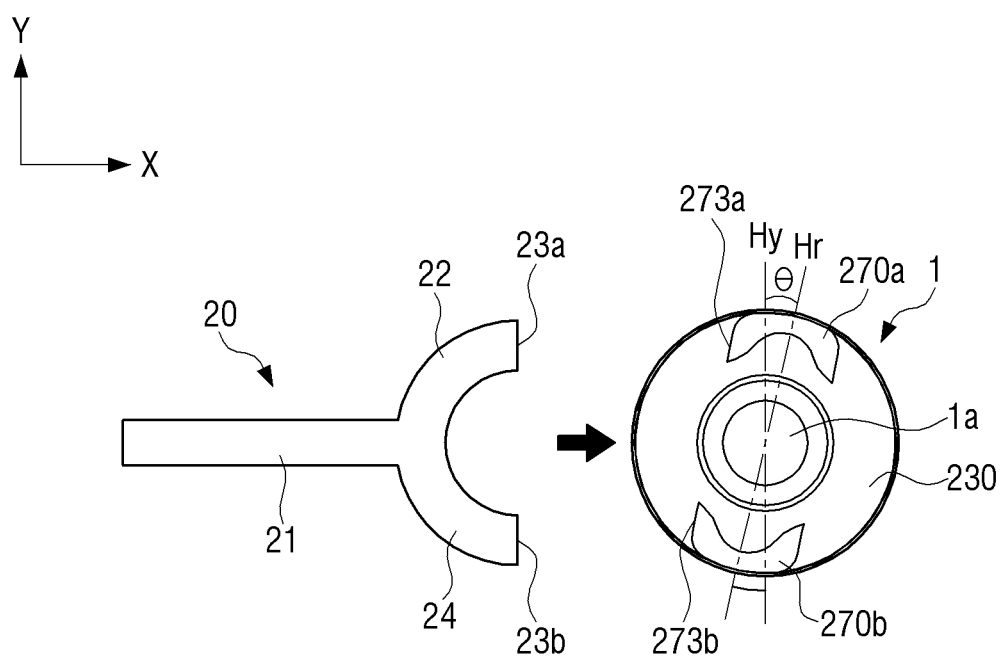
Figure 9B:
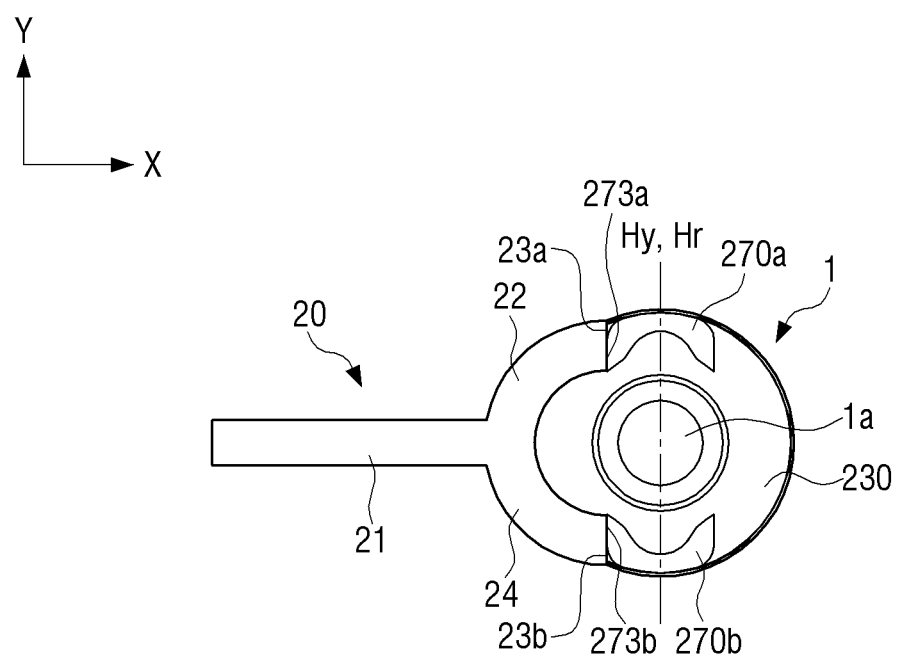
Figure 10:
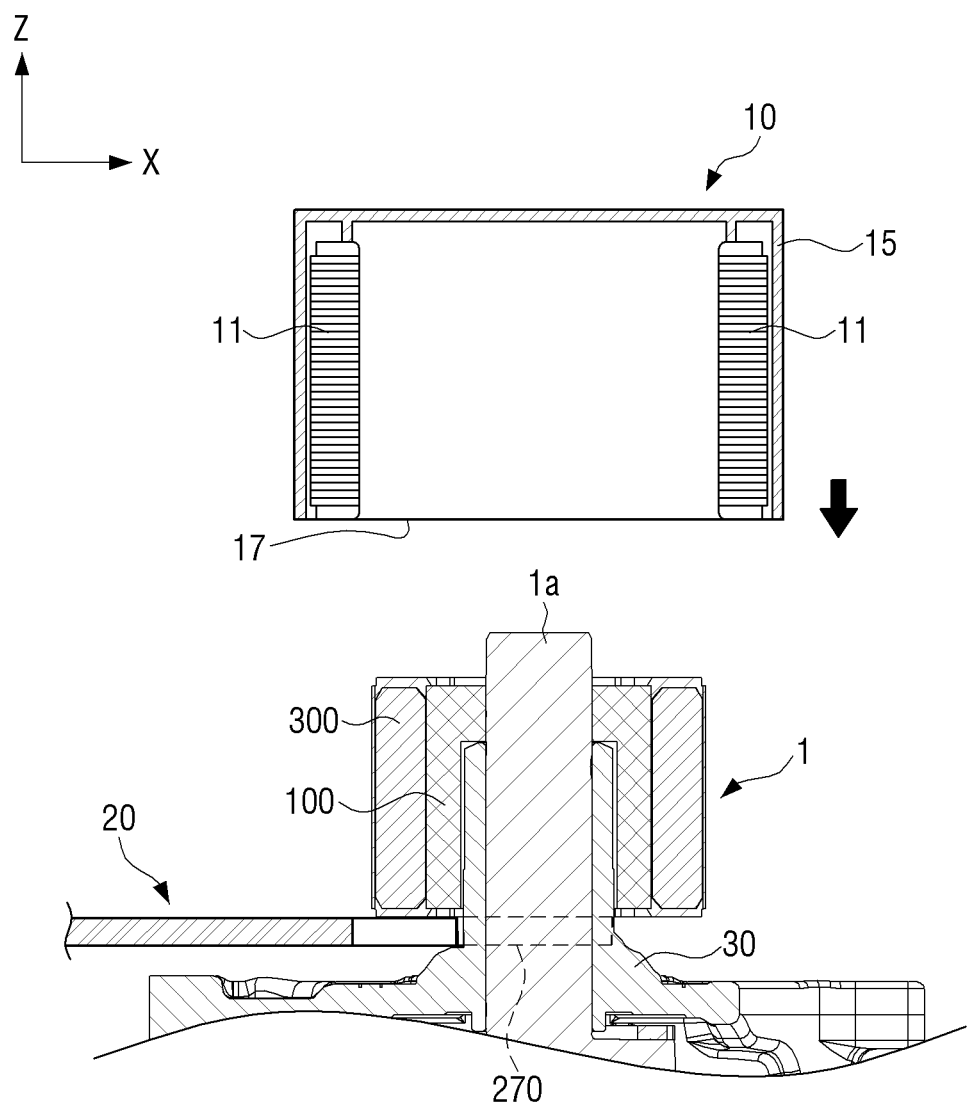

FIGS. 6A, 6B, and 6C are plan views illustrating various examples of magnets buried in a rotor of a compressor motor according to an embodiment of the present disclosure;

FIG. 7 is a plan view illustrating a state where a magnetization device is coupled to a rotor according to an embodiment of the present disclosure;

FIG. 8 is a view illustrating rotation prevention guides formed on a lower cover;

FIG. 9A is a plan view illustrating a state before rotation prevention guides of a rotor are supported by a fixing jig according to an embodiment of the present disclosure;

FIG. 9B is a plan view illustrating a state where rotation prevention guides of a rotor are supported by a fixing jig according to an embodiment of the present disclosure; and FIG. 10 is a side cross-sectional view illustrating a state before a magnetization device is coupled to a rotor according to an embodiment of the present disclosure.

DETAILED DESCRIPTION OF THE EXEMPLARY EMBODIMENTS

Hereinafter, exemplary embodiments of the present disclosure will be described in detail with reference to accompanying drawings. The following description of the exemplary embodiments is based on the most suitable embodiments in understanding the technical features of the present disclosure. However, the technical features of the present disclosure are not limited by the embodiments to be described, but it is exemplified that the present disclosure may be implemented by the embodiments to be described hereinafter.

Accordingly, those of ordinary skill in the art will recognize that various changes and modifications of the embodiments described herein can be made without departing from the scope and spirit of the present disclosure. In addition, in order to help understanding of the embodiments to be described hereinafter, like drawing reference numerals are used for the like elements, even in different drawings.

Hereinafter, the configuration of a compressor motor according to a preferred embodiment of the present disclosure will be described in detail with reference to the accompanying drawings.

Figure 1:
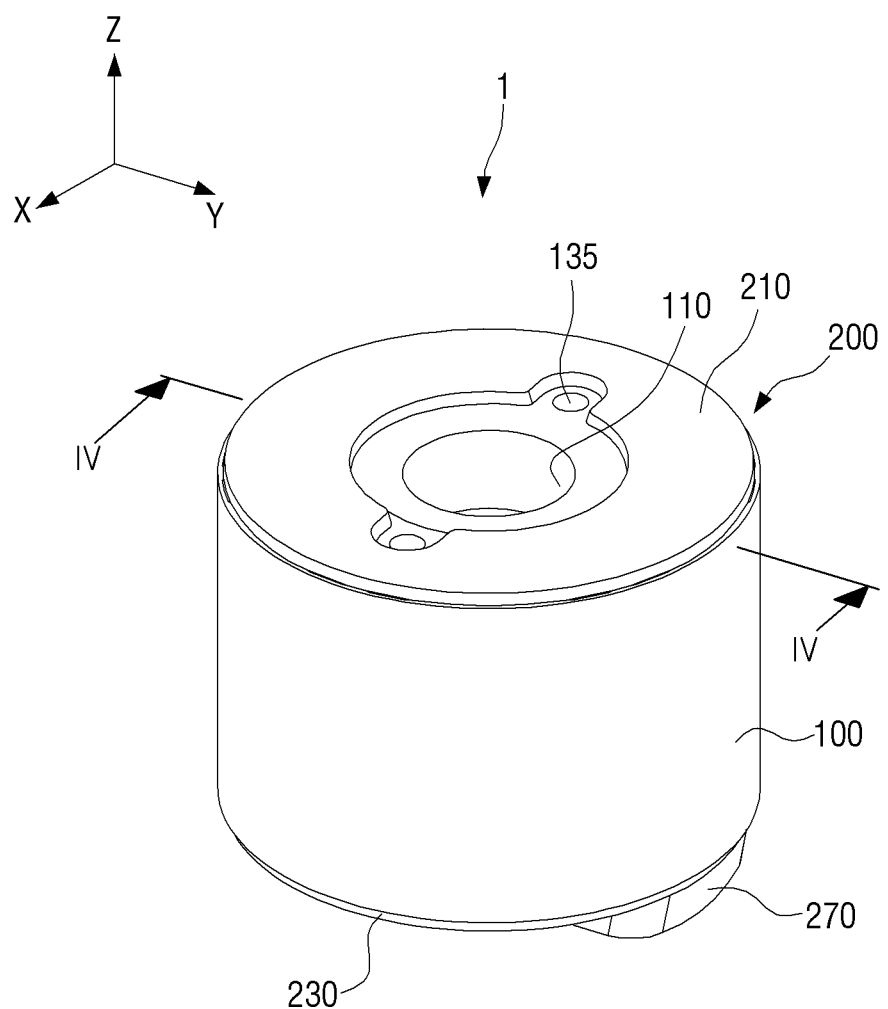
FIG. 1 is a perspective view illustrating a rotor that is applied to a compression motor according to an embodiment of the present disclosure.
Figure 2:
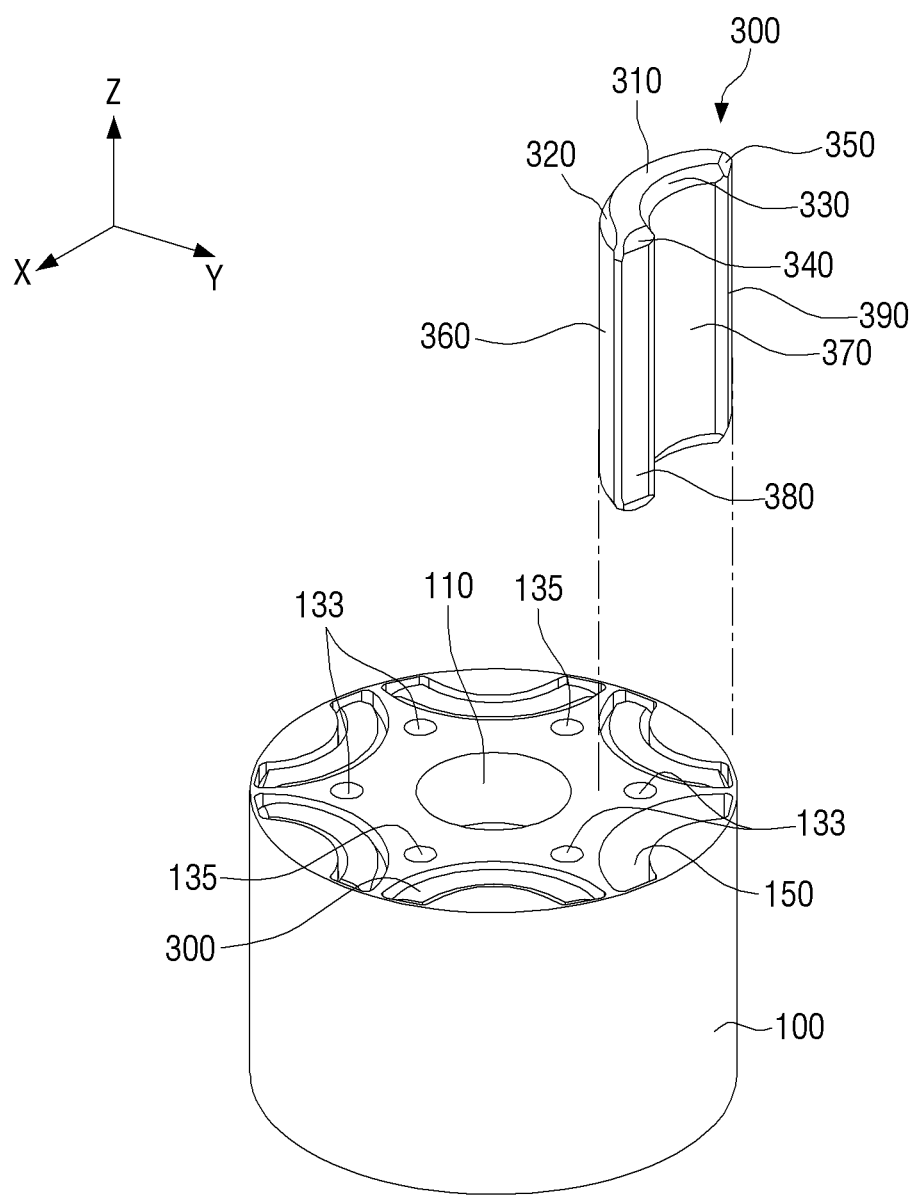
FIG. 2 is a perspective view illustrating a state where a cover of FIG. 1 is removed.

FIG. 1 is a perspective view illustrating a rotor that is applied to a compression motor according to an embodiment of the present disclosure, and FIG. 2 is a perspective view illustrating a state where a cover of FIG. 1 is removed.

Referring to FIGS. 1 and 2, a compressor motor according to an embodiment of the present disclosure includes a stator (not illustrated) and a rotor 1. In this case, the rotor 1 may be inserted into the stator, and may be electromagnetically interact with the stator to be rotated. In this embodiment, it is exemplified that the rotor 1 is configured to be arranged in the stator, but is not limited thereto. The stator may also be arranged to be fixed to an inside of the rotor, and in this case, the rotor may also be configured to be rotated in a state where it surrounds the stator.

In the center of the rotor 1, a rotating shaft 1a is inserted along an axis direction (Z-axis direction). In this case, both ends of the rotating shaft 1a are rotatably supported inside the compressor motor.

The rotor 1 as described above includes a core 100 that is made of a metal that is a magnetic material, a plurality of magnets 300 inserted into the core 100, and an injection-molded cover 200 configured to cover both end portions of the core 100.

The core 100 may be formed by laminating a plurality of thin plate sheets each of which has a predetermined thickness. In the center of the inside of the core 100, a fixing hole 110, into which the rotating shaft 1a is fixedly inserted, may be formed, and a coupling groove (not illustrated) for coupling iron core sheets may be formed.

Further, around the fixing hole 110 of the core 100, a plurality of inflow holes 133 and indication holes 135 may be penetratingly formed along a circumferential direction (P direction in FIG. 3A), and a plurality of insertion holes 150 for inserting the plurality of magnets 300 therein may be formed.

During injection molding of the cover 200, resin may flow into the inflow holes 133. The resin that flows into the inflow holes 133 serves to connect an upper cover 210 that covers an upper end portion of the core 100 and a lower cover 230 that covers a lower end portion of the core 100, which will be described later, to each other.

Since the injection-molded cover 200 covers the both end portions of the core 100, the plurality of magnets 300 are not exposed to an outside. In this case, the indication holes 135 enable a user to recognize an arrangement of the plurality of magnets 300. The plurality of insertion holes 150 are formed to correspond to the shape of the magnets 300, and are arranged at equal intervals along the circumferential direction around the fixing hole 110.

Further, the plurality of insertion holes 150 are formed closest to an outside of the rotor 1, and this is to arrange the plurality of magnets 300 adjacent to the stator. In this case, the core 100 forms magnetic paths that are generated from the plurality of magnets 300.

The plurality of magnets 300 are inserted into the plurality of insertion holes 150, respectively, to be radially arranged around the rotating shaft 1a. In this embodiment, it is exemplified that 6 magnets 300 are arranged. However, the number of magnets being arranged is not limited thereto, but may be variously set.

Each of the plurality of magnets 300 may be in a "C" shape in which one surface thereof convexly projects toward the center of the core 100. In the case where the magnet 300 is in the "C" shape as described above, the cross-sectional area of the magnet 300 becomes larger than the cross-sectional area of a bar-shaped magnet to cause a torque of the magnet to be increased. Further, a magnetic resistance torque can be increased through concentration of the magnetization direction.

Figure 3A:
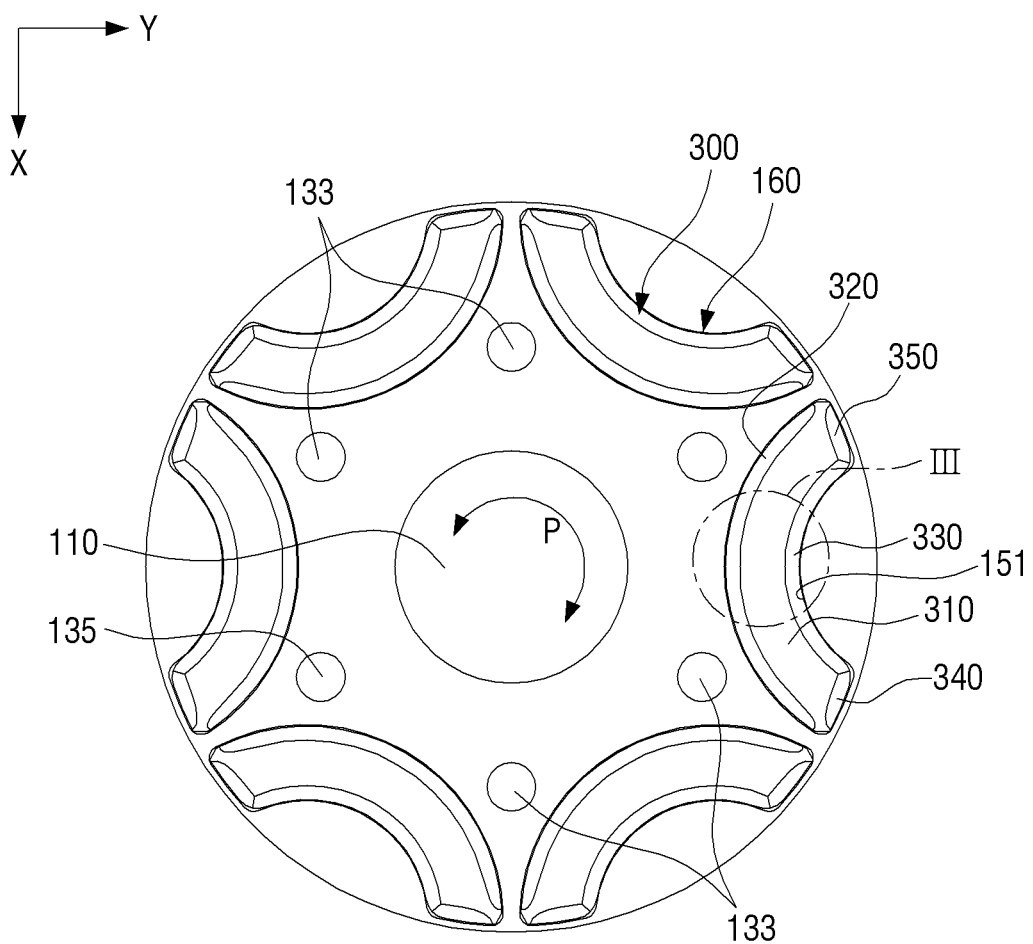
FIG. 3A is a plan view of a rotor of a compressor motor according to an embodiment of the present disclosure.
Figure 3B:
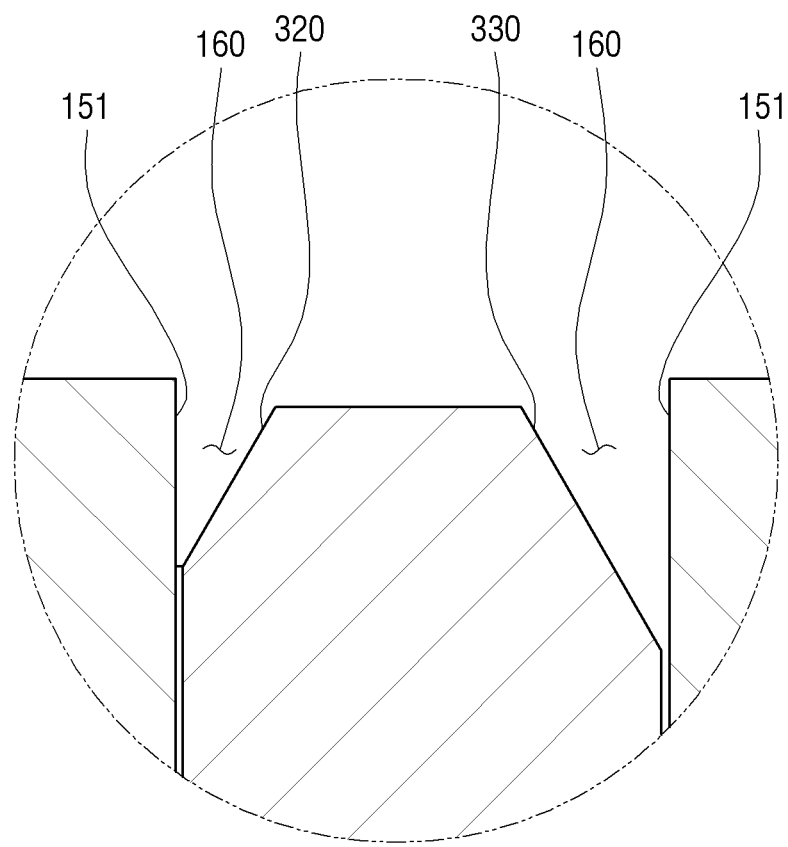
FIG. 3B is an enlarged view of a portion III indicated in FIG. 3A.
Figure 4:
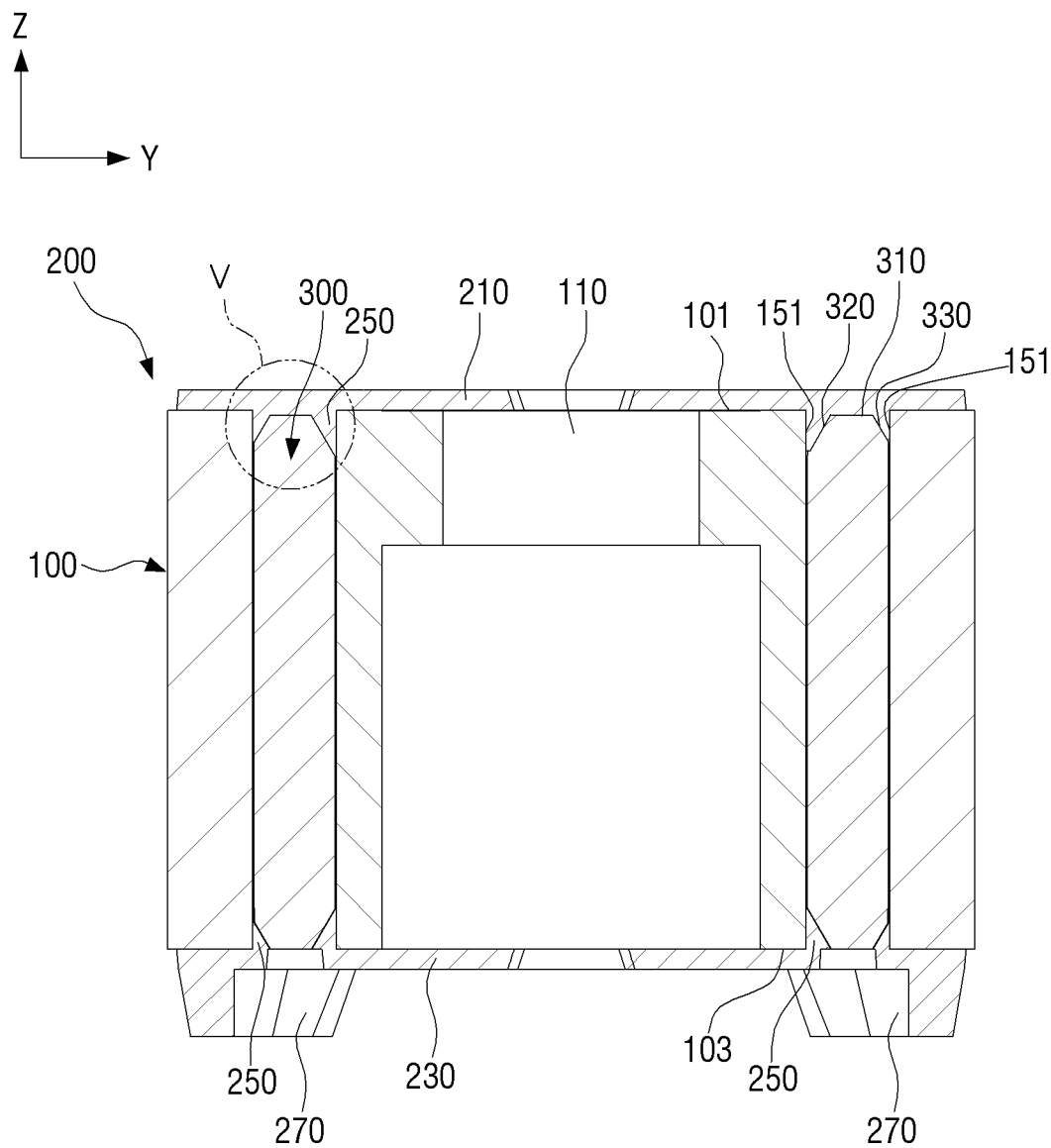
FIG. 4 is a cross-sectional view taken along line IV-IV indicated in FIG. 1.
Figure 5:
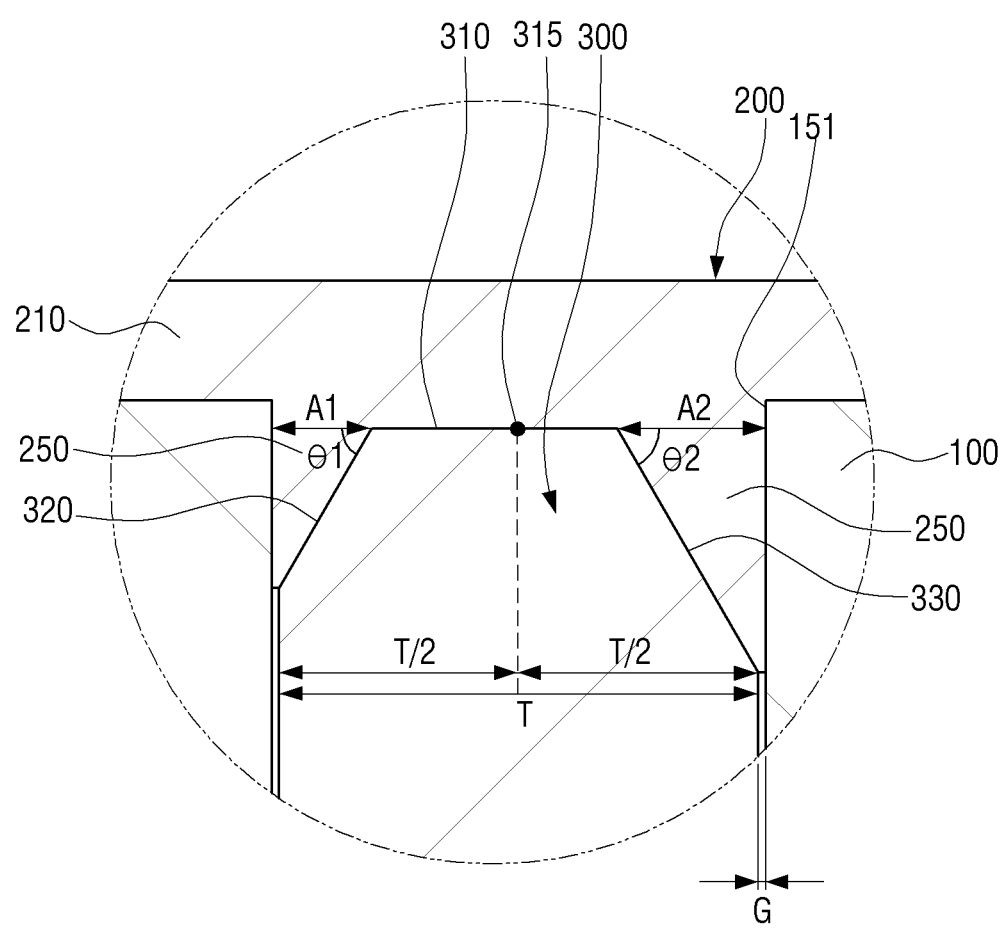
FIG. 5 is an enlarged view of a portion V indicated in FIG. 4.

FIG. 3A is a plan view of a rotor of a compressor motor according to an embodiment of the present disclosure, and FIG. 3B is an enlarged view of a portion III indicated in FIG. 3A. FIG. 4 is a cross-sectional view taken along line IV-IV indicated in FIG. 1, and FIG. 5 is an enlarged view of a portion V indicated in FIG. 4.

The cover 200 may include the upper cover 210 and the lower cover 230 that cover upper and lower end portions of the core 100. As described above, since the upper cover 210 is molded after resin is inserted into the plurality of inflow holes 133, it can be integrally connected to the lower cover 230. In this case, when the resin that forms the cover 200 is injection-molded, the accommodation spaces 160 (see FIG. 3B) are formed between inner peripheries of the plurality of insertion holes 150 and the plurality of magnets 300. The accommodation spaces 160 may be formed between inclined surfaces 320, 330, 340, and 350 that are processed at both ends of the respective magnets 300 and the inner peripheries of the respective insertion holes 150 so as to facilitate the assembly thereof when the magnets 300 are inserted into the insertion holes 150, respectively. On the upper cover 210 and the lower cover 230, extension portions 250 (see FIG. 5) that fill the accommodation spaces 160 are formed.

The plurality of magnets 300 are arranged in a mold for forming the cover 200 in a state where they are inserted into the insertion holes 150 of the core 100, respectively. Then, through a following injection process, the cover 200 is integrally formed with the core 100 and the plurality of magnets 300.

The upper and lower covers 210 and 230 are respectively coupled to upper and lower end portions of the core 100. The upper and lower covers 210 and 230 prevent the plurality of magnets 300 from seceding from the respective insertion holes 150 of the rotor 1 in an axis direction. Further, the upper and lower covers 210 and 230 may be injection-molded to properly change their shapes to keep the balance in the case where imbalance exists on the rotor 1.

The extension portions 250 that are formed on the respective covers 210 and 230 are shaped to roughly correspond to the accommodation spaces 160 so as to fill the accommodation spaces 160. Since the accommodation spaces 160 are filled with the extension portions 250 as described above, the respective magnets 300 are prevented from moving in a radius direction of the rotor 1 in the respective insertion holes 150 even in the case where the rotor 1 is rotated not only at high speed but also at low speed. Accordingly, the rotor 1 is prevented from vibrating due to the movement of the magnets during the rotation thereof, and thus structural intensity and stability can be improved.

Referring to FIG. 3A, the plurality of "C"-shaped magnets 300 that are inserted into the insertion holes 150 of the core 100 are arranged in a symmetrical structure inside the core, and both ends thereof project toward an outside of the core 100.

Referring again to FIG. 2, each of the magnets 300 may include a first side surface 360 that is arranged toward the rotating shaft 1a (see FIG. 9A) and a second side surface 370 that is directed opposite to the first side surface 360, and may further include a third side surface 380 and a fourth side surface 390 for connecting the first side surface 360 and the second side surface 370. The lengths of upper ends of the first and second side surfaces 360 and 370 of the magnet 300 are set to be longer than those of the third and fourth side surfaces 380 and 390.

Each of the magnets 300 may have the inclined surfaces 320, 330, 340, and 350 that are formed to be downwardly inclined in an outside direction of the magnet 300 along edges that are connection portions between the respective side surfaces 360, 270, 380, and 390 and an upper end surface 310. The inclined surfaces may include the first inclined surface 320 that is formed along an upper end of the first side surface 360, the second inclined surface 330 that is formed along an upper end of the second side surface 370, the third inclined surface 340 that is formed along an upper end of the third side surface 380, and the fourth inclined surface 350 that is formed along an upper end of the fourth side surface 390.

Referring to FIG. 3B, if the magnet 300 that has the first to fourth inclined surfaces 320, 330, 340, and 350 is inserted into the insertion hole 150, the accommodation spaces 160 may be formed between the inner periphery of the insertion hole 150 and the first to fourth inclined surfaces 320, 330, 340, and 250.

Referring to FIG. 4, the extension portions 250 that are formed on the upper and lower covers 210 and 230 as described above are shaped to correspond to the accommodation spaces 160 as the resin is pushed into the accommodation spaces 160 in the process of injection-molding the cover 200.

As described above, since the extension portions 250 are formed between the inner peripheries of the respective insertion holes 150 and the respective inclined surfaces 320, 330, 340, and 350 of the magnets 300, they can thoroughly prevent the respective magnets 300 from moving in the radius direction of the rotor 1 in the respective insertion holes 150 by centrifugal forces when the rotor 1 is rotated (e.g., is rotated at low speed). Accordingly, the magnets 300 are stably fixed into the respectively insertion holes 150, and thus the structural intensity and the stability of the rotor 1 can be improved. Further, the magnets 300 can be prevented from being worn down while the magnets 300 rub against the core 100 due to their movement in the insertion holes 150 as the rotor 1 is rotated.

In this embodiment, since it is not necessary to cut parts of the core 100 (e.g., upper edges of the insertion hole 150) in order to provide the accommodation spaces 160 for forming the extension portions 250, magnetic paths can be maintained as they are, and thus leakage magnetic flux can be reduced. Further, since it is not necessary to add a separate configuration for preventing the movement of the magnets 300, the radius of the rotor 1 can be prevented from being unnecessarily increased to achieve miniaturization of the compressor motor.

On the other hand, the respective inclined surfaces of the magnet 300 can be formed along not only the upper edge of the magnet 300 but also the lower edge of the magnet 300.

Referring to FIG. 5, distances A1 and A2 between the inclined surfaces 320 and 330 of the magnet 300 and the inner periphery 151 of the insertion hole 150 may be larger than 0.1 times the thickness T of the magnet 300, and may be smaller than 0.5 times the thickness T thereof. That is, the distances A1 and A2 between the inclined surfaces 320 and 330 and the inner periphery 151 may be in the range between 0.1 times and 0.5 times the thickness T. In addition, it is sufficient that the inclined surfaces 320 and 330 are formed so that the inclined surfaces 320 and 330 and the inner periphery 151 of the insertion hole 150 are spaced apart from each other to the extent that the accommodation space 160 can be formed between the magnet 300 and the inner periphery 151 of the insertion hole 150. For example, the inclined surfaces may be formed maximally from a point 315 that corresponds to a half of the thickness T/2 of the magnet 300, and may be formed minimally from a point that corresponds to 1/10 of the thickness T/10 of the magnet 300.

The distance A1 between the first inclined surface 320 and the inner periphery 151 of the insertion hole 150 may be set to be different from the distance A2 between the second inclined surface 330 and the inner periphery 151 of the insertion hole 150. Accordingly, the cross-sectional areas of the formed accommodation spaces 160 may be set to be different from each other.

The angle θ1 that is made between the inclined surface 320 of the magnet and an extension line of the upper end surface 310 of the magnet 300 may be larger than 0° and may be smaller than 90°. The angle θ1 that is made between the first inclined surface 320 and the extension line of the upper end surface 310 may be set to be different from the angle θ2 that is made between the second inclined surface 330 and the extension line of the upper end surface 310.

In accordance with a difference between the distances between the inclined surface and the inner periphery 151 of the insertion hole 150 and a difference between the angles made between the inclined surface and the extension line of the upper end surface 310, the cross-sectional areas of the accommodation spaces 160 that are formed between the inclined surface of the magnet 300 and the inner periphery 151 of the insertion hole 150 may be set to be different from each other.

A predetermined gap G may be formed between the inner periphery 151 of the insertion hole 150 and the magnet 300 so that the magnet 300 can be smoothly inserted into the core 100. Since the gap G is formed to be quite narrow in the range of 0.05 mm to 0.2 mm, it does not cause anxiety that resin flows into the gap G during the injection molding of the cover 200.

On the other hand, due to the inclined surfaces 320, 330, 340, and 350, the cross section of the extension portion 250 may be roughly in a triangle shape (e.g., in a wedge shape). As described above, the cross-sectional shape of the extension portion 250 is affected by the shapes of the inclined surfaces 320, 330, 340, and 350. That is, if the inclined surfaces 320, 330, 340, and 350 are curved surfaces or multi-bent surfaces, one surface of the extension portion 250 that corresponds to the inclined surfaces follows the shapes of the inclined surfaces.

FIGS. 6A, 6B, and 6C are plan views illustrating various examples of magnets buried in a rotor of a compressor motor according to an embodiment of the present disclosure.

As illustrated in FIGS. 6A to 6C, the number of accommodation spaces 160 to be formed may be changed in accordance with the inclined surfaces that are formed on the magnets 301, 302, and 303.

Referring to FIG. 6A, on the magnet 301, the inclined surfaces 320 and 330 may be formed only at edges that connect the upper end surface 310, the first side surface 360, and the second side surface 370. In this case, the accommodation spaces 160 are formed only between the first and second inclined surfaces 320 and 330 and the inner periphery 151 of the insertion hole 150. Accordingly, the number of extension portions 250 to be formed is set to correspond to the accommodation spaces 160.

Referring to FIG. 6B, only the third and fourth inclined surfaces 340 and 350 may be formed on the magnet 302. Further, referring to FIG. 6C, only the first and third inclined surfaces 320 and 340 may be formed on the magnet 303.

As described above, since the positions of the inclined surfaces of the magnet 300 are variously set, it is possible to form the extension portions 250 of various shapes that can prevent the movement of the magnet 300 during the injection molding of the cover 200.

FIG. 7 is a plan view illustrating a state where a magnetization device is coupled to a rotor according to an embodiment of the present disclosure.

In order to solve the problem that a process for manufacturing the rotor 1 is delayed and to easily manufacture the rotor 1, non-magnetized magnets 300 are inserted into the rotor 1. The magnets 300, which initially have no polarity, may have the polarities through a magnetization process in a state where the magnets 300 are inserted into the rotor 1. In this case, it is required to match the position of the rotor with a magnetization device so that a portion that becomes a magnetic pole of the non-magnetized magnet corresponds to the magnetic pole position of magnetic flux that is generated by the magnetization device.

FIG. 7 is a plan view illustrating a state where a magnetization device is coupled to a rotor according to an embodiment of the present disclosure.

The magnets 300 are magnetized through application of a magnetization power to a separate magnetization yoke 11.

The magnetization device 10 is configured to include the magnetization yoke 11 and a body portion 15 (see FIG. 10). The magnetization yoke 11 forms a ring-shaped outer periphery, and includes a plurality of projections 13 that project from the magnetization yoke 11 to an inside. The projections 13 are arranged to be spaced apart from each other for a predetermined distance to face outer surfaces of the plurality of magnets 300. The plurality of projections 13 form the polarities of the magnets 300 through magnetization of the respective magnets 300 that correspond to the respective projections 13.

If a high magnetization power is instantaneously applied to the magnetization yoke 11, magnetic domains of the magnet 300 that is within the range of magnetic fields that are formed around the respective projections 13 are arranged in a constant direction to cause the magnet 300 to have the polarity.

If the magnets 300 are magnetized in a state where the magnets 300 and the projections 13 are positioned to depart from each other, the amount of magnetization becomes insufficient to deteriorate the driving efficiency of a motor (not illustrated). Accordingly, it is required to match the position of the rotor 1 with the magnetization yoke 11 so that the respective non-magnetized magnets 300 correspond to the magnetic fields that are generated from the respective projections 13 of the magnetization yoke 11. In order to match the magnetization position of the rotor 1 with the magnetization yoke 11, the rotor 1 may be provided with a pair of rotation prevention guides 270.

The pair of rotation prevention guides 270 may project from an outer surface of the lower cover 230 that covers one end portion 103 of the core 100. The pair of rotation prevention guides 270 may be arranged to correspond to the positions of a pair of magnets 300 that face each other among the plurality of magnets 300. Since the injection-molded cover 200 covers both end portions 101 and 103 of the core 100, the plurality of magnets 300 are not exposed to an outside, and thus it is not possible to grasp the positions of the magnets by the naked eye. However, the positions of the magnets 300 that are inserted into the rotor 1 can be indirectly known through the positions of the rotation prevention guides 270.

If the magnetization position of the rotor 1 is set through rotation of the rotor 1 so that a pair of rotation prevention guides 270 correspond to a pair of projections 13 that face each other among the plurality of projections 13, the positions of the plurality of magnets 300 can be arranged to coincide with the positions of the plurality of projections 13 of the magnetization yoke 11.

In this case, a fixing jig 20 (see FIG. 9A) to be described later may be used to rotate the rotor 1 to the magnetization position. The fixing jig 20 will be described in detail with reference to FIG. 9A.

A plurality of rotation prevention guides 270 may be formed. Specifically, a first rotation prevention guide 270a and a second rotation prevention guide 270b may be formed. In this case, the rotation prevention guides 270a and 270b may be symmetrically arranged about the center of the core 100. The centers of the first and second rotation prevention guides 270a and 270b and the core 100 are arranged in a straight line.

The first rotation prevention guide 270a may be formed in a position in which the first magnet 300 is inserted, and the second rotation prevention guide 270b may be formed in a position in which the second magnet 300 is inserted. The first and second magnets 300a and 300b are symmetrically arranged about the center of the core 100.

A straight line Hy as illustrated in FIG. 7 is a line that connects the core center and the centers of the first and second projections 13a and 13b that are symmetrically arranged about the core center with each other, and corresponds to a reference line Hy that indicates the magnetization position of the rotor. In the case where a center line Hr, which connects the center of the first rotation prevention guide 270a and the center of the second rotation prevention guide 270b with each other, coincides with the reference line Hy, the position of the rotor 1 is called the magnetization position. When the rotor 1 is in the magnetization position, the plurality of magnets 300 are positioned to correspond to the plurality of projections 13. Accordingly, the magnets 300 can be sufficiently magnetized in the magnetization position of the rotor 1.

Even if the rotor 1 is rotated only at a predetermined angle from the magnetization position, the magnetization angle of the magnets 300 gets twisted. In this case, a center line Hx and the reference line Hy do not coincide with each other. If the magnetization is made in a state where the rotor 1 is rotated even at the predetermined angle from the magnetization position, non-magnetized portions may occur on the magnets 300. For sufficient magnetization of the magnets 300, the rotation prevention guides 270 match the magnetization position of the rotor 1 through the fixing jig 20, and fix the rotor 1 into the magnetization position of the rotor 1 during the magnetization.

On the other hand, if excessively strong rotating magnetic field is formed on the rotor due to high magnetization power that is applied to the magnetization yoke 11 during the magnetization of the magnets 300, the rotor 1 may be moved while it is rotated or shaken due to the rotating magnetic field. If the rotor 1 is rotated during the magnetization, the magnets 300 may not be magnetized properly. To prevent this, it is required to fixedly support the rotor 1 so that the rotor 1 is prevented from being moved during the magnetization of the magnets 300.

The rotor is fixed to the magnetization position without being rotated by the fixing jig 20 to be described later.

FIG. 8 is a view illustrating rotation prevention guides formed on a lower cover.

Referring to FIG. 8, the rotor 1 includes the rotation prevention guides 270 that project from the surface of the cover 200 that covers one end portion of the core 100. In this case, without being limited to the lower cover, the rotation prevention guides 270 locate the rotor 1 in the magnetization position before the magnetization of the magnet 300, and fixedly support the rotor 1 in the magnetization position during the magnetization of the magnets 300.

The rotation prevention guides 270 may be integrally injection-molded with the cover 200. Since the rotation prevention guides 270 are integrally injected with the cover 200, the number of components that are required to manufacture the rotor is reduced. Accordingly, the manufacturing cost of the rotor 1 is reduced, and the manufacturing process of the rotor 1 is simplified.

The rotation prevention guides 270 are formed to project from parts of the lower cover 230. The rotation prevention guides 270 may be formed to extend from the lower cover 230 to an outside of the core 100. The rotation prevention guides 270 are formed to have a predetermined height so as to be fixedly supported by the fixing jig 20 to be described later. The rotation prevention guides 270 may be formed to project from the lower cover 230 with a height that is substantially equal to or larger than 1 mm and equal to or smaller than 20 mm.

The rotation prevention guides 270 include the first rotation prevention guide 270a and the second rotation prevention guide 270b that are symmetrically arranged about the center of the core 100. The first and second rotation prevention guides 270a and 270b include support surfaces 273a and 273b that come in contact with the fixing jig 20 to be described later. A first fixing portion 22 (see FIG. 9A) of the fixing jig 20 comes in surface contact with the first support surface 273a of the first rotation prevention guide 270a, and a second fixing portion 24 (see FIG. 9A) of the fixing jig 20 comes in surface contact with the second support surface 273b of the second rotation prevention guide 270b. The rotation prevention guides 270 and the fixing jig 20 rotate the rotor 1 into the magnetization position before the magnetization, and fixedly support the rotor 1 so that the rotor 1 is not rotated during the magnetization.

The first and second rotation prevention guides 270b may be formed in a semicircular shape, but are not limited thereto. The first and second rotation prevention guides 270a and 270b may be radially formed as long as the first and second rotation prevention guides 270a and 270b can be symmetrically formed. Hereinafter, referring to FIGS. 9A and 9B, a process of matching the rotor 1 with the magnetization position in order to magnetize the magnets 300 that are inserted into the rotor 1 will be described.

FIG. 9A is a plan view illustrating a state before rotation prevention guides of a rotor are supported by a fixing jig according to an embodiment of the present disclosure, and shows a state before the rotor is set in the magnetization position. FIG. 9B is a plan view illustrating a state where rotation prevention guides of a rotor are supported by a fixing jig according to an embodiment of the present disclosure, and shows a state where the rotor is set into the magnetization position.

Referring to FIG. 9A, before the magnetization of the magnets 300, it is required to set the magnetization position of the rotor 1 so that the positions of the magnets 300 correspond to the positions of the projections 13 of the magnetization yoke 11. A separate fixing jig 20 may be provided to match the rotor 1 with the magnetization position.

The fixing jig 20 has a first fixing portion 22 and a second fixing portion 24, which extend toward the rotor 1, and a length portion 21 that extends toward an opposite direction of the rotor 1.

The first fixing portion 22 and the second fixing portion 24 may be branched from one end of the length portion 21, and may be symmetrically formed about the length portion 21. The first fixing portion 22 may support the first rotation prevention guide 270a of the rotor 1, and the second fixing portion 24 may support the second rotation prevention guide 270b of the rotor 1. The first fixing portion 22 includes a first fixing surface 23a that comes in surface contact with the first support surface 273a of the first rotation prevention guide 270a, and the second fixing portion 24 includes a second fixing surface 23b that comes in surface contact with the second support surface 273b of the second rotation prevention guide 270b.

The length portion 21 is connected to a driving portion (not illustrated) to make the fixing jig 20 reciprocate in a straight line in an X-axis direction. Here, the driving portion may use a hydraulic or pneumatic cylinder device.

Hereinafter, referring to FIGS. 9A and 9B, a process of setting the magnetization position of the rotor 1 through the fixing jig 20 will be described.

It is assumed that the rotor 1 before setting of the magnetization position is in a position in which the center line Hx is rotated clockwise as much as a predetermined angle θ from the reference line Hy as shown in FIG. 9A. In this case, the second rotation prevention guide 270b is arranged to be closer to the fixing jig 20 than the first rotation prevention guide 270a.

In this case, if the fixing jig 20 straightly moves toward the rotor 1 along the X-axis direction, the second fixing surface 23b of the fixing jig 20 and the second support surface 273b of the second rotation prevention guide 270b first come in contact with each other. In this state, if the fixing jig 20 continues to move straight in the X-axis direction, the second rotation prevention guide 270b is pushed by the second fixing portion 24, and the rotor 1 is rotated counterclockwise.

If the rotor 1 is rotated counterclockwise as much as the predetermined angle θ, the first support surface 273a of the first rotation prevention guide 270a and the first fixing surface 23a of the first fixing portion 22 come in contact with each other to make the center line Hx of the rotor coincide with the reference line Hy. Accordingly, as shown in FIG. 9B, the rotor 1 can be set into the magnetization position.

As described above, since the fixing jig 20 supports the rotation prevention guides 270 in order to magnetize the plurality of magnets 300 that are inserted into the rotor 1, the rotor 1 can be accurately located in the magnetization position. Through the method for setting the magnetization position of the rotor according to the present disclosure, a part of the cover or the core can be prevented from being damaged by impacts, and the magnetization position of the rotor can be set accurately and easily.

Further, while the magnets 300 are magnetized, the fixing jig 20 continuously support the rotation prevention guides 270 to prevent the rotor 1 from being rotated. Accordingly, it becomes possible to prevent the magnetization position of the rotor 1 from getting twisted during the magnetization process.

FIG. 10 is a side cross-sectional view illustrating a state before a magnetization device is coupled to a rotor according to an embodiment of the present disclosure.

The fixing jig 20 fixedly supports the rotor 1 to prevent the rotor 1 from being moved as being rotated or shaken in the magnetization yoke 11 by the influence of the rotating magnetic field. Accordingly, during the magnetization of the magnets 300, the polarity arrangement of the magnets 300 can be formed accurately and uniformly.

The magnetization device 10 includes the magnetization yoke 11 and the yoke body 15 that surrounds the magnetization yoke 11. The yoke body 15 is formed in a cylindrical shape that extends in the length direction of the magnetization yoke 11 from an upper portion of the magnetization yoke 11 that is arranged in the yoke body 15. The yoke body 15 may ascend or descend up and down (Z-axis direction). A through-hole 17 is formed on a lower portion of the yoke body 15 so that the rotor 1 passes through the through-hole 17.

If the magnetization device 10 descends in the direction of the rotor 1, magnetization of the magnets 300 that are inserted into the rotor 1 is performed. Hereinafter, a process of magnetizing the magnets 300 will be described.

The rotor 1 is provided to be rotated in the stator (not illustrated) through electrical interaction with the stator. The rotor 1 is assembled to be provided with the rotating shaft 1a that is pressingly inserted into the center of the rotor 1 to be rotated together with the rotor 1.

The rotating shaft 1a is formed so that upper and lower ends thereof extend up and down for a predetermined length. The rotating shaft 1a that extends to the lower portion of the rotor 1 is rotatably supported through a journal bearing 30.

In order to match the magnetization position of the rotor 1 that is supported by the journal bearing 30, the fixing jig 20 comes in contact with the rotation prevention guides 270 of the rotor 1. Since the fixing jig 20 and the rotation prevention guides 270 come in contact with each other, it becomes possible to match the magnetization position of the rotor 1 accurately. Further, only through the straight movement of the fixing jig 20, it becomes possible to easily match the magnetization position of the rotor 1.

After the rotor 1 is located in the magnetization position, the magnetization device 10 that is located on the upper portion of the rotor 1 is moved downward. Through the descending of the magnetization device 10, the rotor 1 is arranged inside the magnetization yoke 11. The magnetization yoke 11 is in a state where it surrounds the rotor 1, and the upper end of the rotor 1 comes in contact with the upper end of the yoke body 15.

In this state, if the yoke body 15 is pressed downward, the rotor 1 is fixedly supported by the fixing jig 20 so that the rotor 1 is prevented from being moved between the journal bearing 30 and the magnetization yoke 11. In this state, if a magnetization power is applied to the magnetization yoke 11 to magnetize the magnets 300, the rotor 1 is prevented from being moved due to the rotating magnetic field that is generated in the process of magnetizing the magnets 300. Accordingly, the magnets 300 are magnetized with uniform magnetic polarity arrangement. The magnets 300 that are magnetized as described above have magnetism that is higher than that of the magnetization method in the related art.

As described above, the compressor motor according to this embodiment can be applied to various home appliances, for example, a washing machine, a clothes drier, an air conditioner, a refrigerator, and a compressor.

Although the preferred embodiments of the present disclosure have been individually described, the present disclosure is not limited to the specific embodiments as described above, but it will be understood by those skilled in the art that various changes in form and detail may be made therein without departing from the spirit and scope of the present invention, as defined by the appended claims. Such modified embodiments should not be individually understood from the technical concept or prospect of the present disclosure.

What is claimed is:

1. A compressor motor comprising:
   a stator; and
   a rotor configured to electromagnetically interact with the stator and rotate,
   wherein the rotor includes:
      a core having upper and lower end portions and a plurality of insertion holes formed within the core between the upper and lower end portions of the core;
      a plurality of magnets respectively inserted into the plurality of insertion holes of the core to form accommodation spaces between the core and the inserted plurality of magnets; and
      at least one injection-molded cover injection-molded to the core that fills the accommodation spaces and covers both of the upper and lower end portions of the core,
      wherein the at least one injection molded cover comprises rotation prevention guides integrally injection-molded with the at least one injection molded cover.

2. The compressor motor as claimed in claim 1, wherein the accommodation spaces are provided between an upper or lower end portion of the plurality of magnets and the plurality of insertion holes of the core into which the plurality of magnets are respectively inserted.

3. The compressor motor as claimed in claim 2, wherein the at least one injection molded cover comprises extension portions that fill the accommodation spaces.

4. The compressor motor as claimed in claim 3, wherein the extension portions have cross sections that are in a triangle shape.

5. The compressor motor as claimed in claim 2, wherein the accommodation spaces are formed along edges of at least one of the upper or lower end portions of the plurality of magnets.

6. The compressor motor as claimed in claim 1, wherein the accommodation spaces are provided between inclined surfaces that are formed along edges of at least one of upper or lower end portions of each magnet of the plurality of magnets and inner peripheries of the plurality of insertion holes of the core into which the respective magnets are respectively inserted.

7. The compressor motor as claimed in claim 6, wherein the inclined surfaces are formed on at least parts of the edges of the upper or lower end portions of each magnet of the plurality of magnets.

8. The compressor motor as claimed in claim 6, wherein the inclined surfaces are formed to be downwardly inclined in an outside direction of each magnet of the plurality of magnets.

9. The compressor motor as claimed in claim 1, wherein each magnet of the plurality of magnets is in "C" shape in which one surface thereof convexly projects toward a center of the core.

10. The compressor motor as claimed in claim 1, wherein the rotation prevention guides prevent the rotor from being rotated while the plurality of magnets are magnetized.

11. The compressor motor as claimed in claim 10, wherein the rotation prevention guides comprise a plurality of projections that symmetrically project about a center of the core.

12. A method for magnetizing a rotor of a compressor motor as claimed in claim 10, comprising:
fixing the rotor into a magnetization position by making a fixing jig come in close contact with the rotation prevention guides;
inserting the rotor into a magnetization yoke by moving the magnetization yoke in a direction of the fixed rotor that is fixed into the magnetization position; and
magnetizing the plurality of magnets included in the fixed rotor through application of a magnetization power to the magnetization yoke.

13. The method as claimed in claim 12, wherein the fixing jig continuously supports the rotation prevention guides during the magnetization.

14. A compressor motor comprising:
a stator; and
a rotor configured to electromagnetically interact with the stator and rotate,
wherein the rotor includes:
a core having upper and lower end portions and a plurality of insertion holes formed within the core between the upper and lower end portions of the core;
a plurality of magnets having inclined surfaces that are formed along edges of upper and lower end portions of magnets of the plurality of magnets, the plurality of magnets respectively inserted into the plurality of insertion holes to form accommodation spaces between inner peripheries of the plurality of insertion holes and the inclined surfaces of the plurality of magnets;
a first injection molded cover and a second injection-molded cover that cover both of the upper and lower end portions of the core, at least one of the first injection molded cover and second injection-molded covers being injection-molded to the core to fill the accommodation spaces to form extension portions integrally formed with the at least one of the first injection molded cover and the second injection molded cover filling the accommodation spaces,
wherein the second injection molded cover comprises rotation prevention guides that are integrally injection-molded with the second injection molded cover.

15. The compressor motor as claimed in claim 14, wherein the inclined surfaces are formed to downwardly incline in an outside direction of each magnet of the plurality of magnets.

16. The compressor motor as claimed in claim 14, wherein each magnet of the plurality of magnets is in "C" shape in which one surface thereof convexly projects toward a center of the core.

17. The compressor motor as claimed in claim 14, wherein the rotation prevention guides fix the rotor thereto when the magnets are magnetized.

18. The compressor motor as claimed in claim 14, wherein the rotation prevention guides locate the rotor in a magnetization position.

19. The compressor motor as claimed in claim 14, wherein the rotation prevention guides are symmetrically formed about a center of the core.

* * * * *